United States Patent
Peterson et al.

(10) Patent No.: US 10,621,015 B2
(45) Date of Patent: Apr. 14, 2020

(54) NOTIFICATION FOR UNSAVED DATA

(71) Applicant: Lenovo (Singapore) Pte. Ltd., Singapore (SG)

(72) Inventors: Nathan J. Peterson, Oxford, NC (US); John Carl Mese, Cary, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 128 days.

(21) Appl. No.: 15/892,827

(22) Filed: Feb. 9, 2018

(65) Prior Publication Data
US 2019/0250963 A1    Aug. 15, 2019

(51) Int. Cl.
*G06F 9/54* (2006.01)
*G06F 3/0481* (2013.01)

(52) U.S. Cl.
CPC .......... *G06F 9/542* (2013.01); *G06F 3/0481* (2013.01)

(58) Field of Classification Search
CPC .............................. G06F 9/542; G06F 3/0481
See application file for complete search history.

(56) References Cited

U.S. PATENT DOCUMENTS

| | | | | |
|---|---|---|---|---|
| 6,463,545 B1* | 10/2002 | Fisher | ..................... | G06F 1/263 713/300 |
| 6,691,049 B1* | 2/2004 | Jeansonne | ................. | G06F 1/28 320/134 |
| 2005/0177780 A1* | 8/2005 | Chang | ....................... | G06F 1/30 714/47.1 |
| 2009/0293068 A1* | 11/2009 | Yagiu | ..................... | G01C 21/26 719/318 |
| 2010/0328080 A1* | 12/2010 | Tracy | ..................... | G06F 1/206 340/584 |
| 2015/0039925 A1* | 2/2015 | Huang | .................. | G06F 1/3212 713/323 |
| 2015/0089287 A1* | 3/2015 | Jayakumar | ................ | G06F 1/30 714/23 |
| 2015/0362982 A1* | 12/2015 | Yu | ............................. | G06F 1/30 713/323 |
| 2017/0169072 A1* | 6/2017 | Crawford | .......... | G06F 16/24552 |

* cited by examiner

*Primary Examiner* — Shourjo Dasgupta
(74) *Attorney, Agent, or Firm* — Ference & Associates LLC

(57) ABSTRACT

One embodiment provides a method, including: identifying, at an information handling device, user input provided to at least one application, wherein the at least one application does not support an auto-save feature; determining, using a processor, whether the user input has been saved; and providing, responsive to determining that the user input has not been saved, a notification to a user that the user input has not been saved, wherein the notification is outside of the at least one application. Other aspects are described and claimed.

15 Claims, 3 Drawing Sheets

NOTIFICATION FOR UNSAVED DATA

BACKGROUND

Information handling devices ("devices"), for example laptop and personal computers, smart phones, tablet devices, and the like, comprise a variety of different applications that a user may interact with. These applications, as well as the overarching operating system, are often subjected to software updates that address and solve existing issues, insert novel features, change one or more interfacing aspects, and the like. In order for an update to be fully completed, the application to be updated must be shut down so that processes of the application are no longer running or are being used. An effective way to shut down multiple applications is to force the system to undergo a restart, or "reboot".

BRIEF SUMMARY

In summary, one aspect provides a method, comprising: identifying, at an information handling device, user input provided to at least one application, wherein the at least one application does not support an auto-save feature; determining, using a processor, whether the user input has been saved; and providing, responsive to determining that the user input has not been saved, a notification to a user that the user input has not been saved, wherein the notification is outside of the at least one application.

Another aspect provides an information handling device, comprising: a processor; a memory device that stores instructions executable by the processor to: identify user input provided to at least one application, wherein the at least one application does not an support auto-save feature; determine whether the user input has not been saved; and provide, responsive to determining that the user input has not been saved, a notification to a user that the user input has not been saved, wherein the notification is outside of the at least one application.

A further aspect provides a product, comprising: a storage device that stores code, the code being executable by a processor and comprising: code that identifies user input provided to at least one application, wherein the at least one application does not support an auto-save feature; code that determines whether the user input has been saved; and code that provides, responsive to determining that the user input has not been saved, a notification to a user that the user input has not been saved, wherein the notification is outside of the at least one application.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
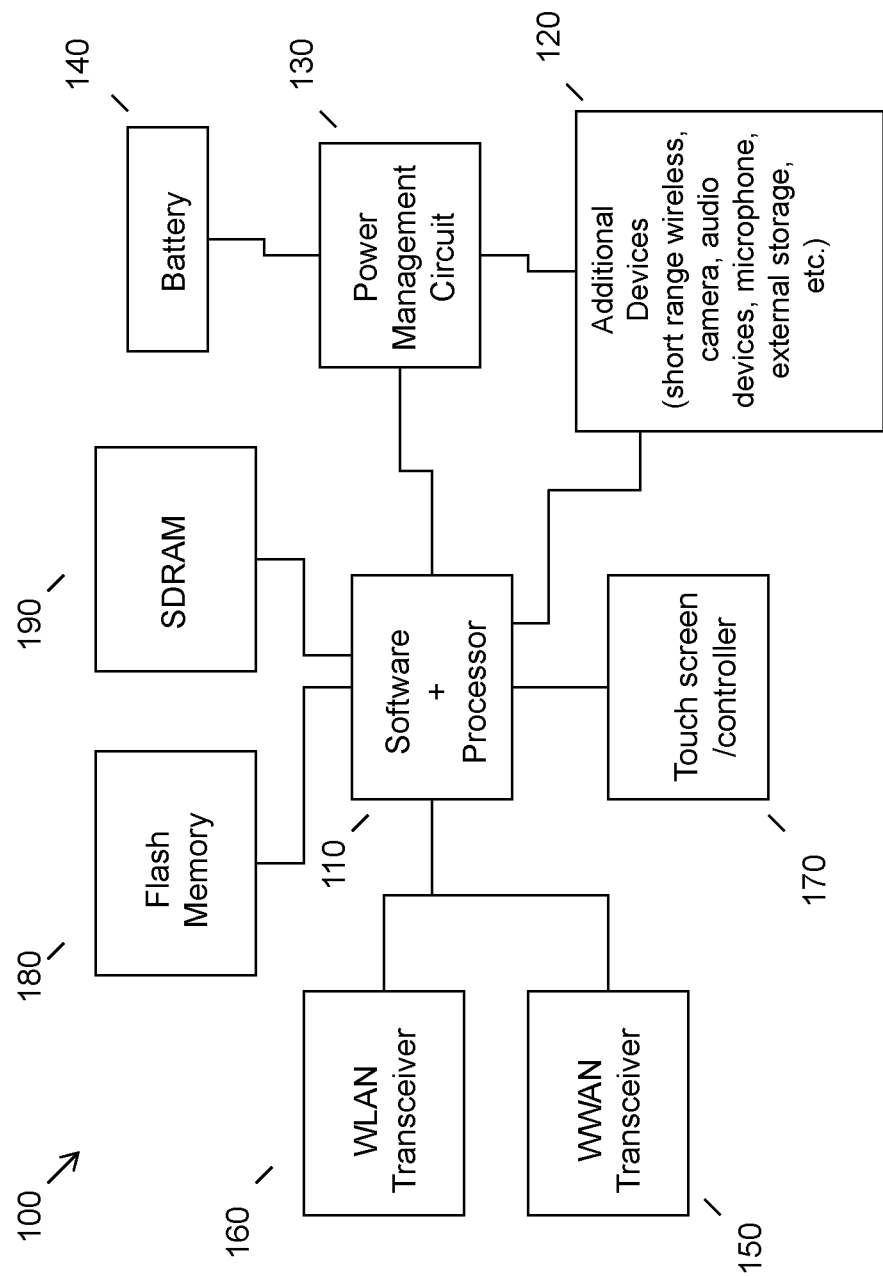
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Modern computer systems (e.g., personal and laptop computers, smart phones, tablets, etc.) regularly perform automatic reboots (e.g., to process updates, etc.). These reboots are generally performed during periods of identified inactivity (e.g., after a user has left their device and has not provided any input to the device for a predetermined amount of time, etc.) or at periods of assumed inactivity (e.g., in the middle of the night when most users are generally sleeping, etc.). Upon return to their device and after completion of the reboot process, users often find that none of their previously opened applications are still active and running. Although a visual notification is generally provided by the system to apprise the user that their applications have been closed because a reboot has just taken place, many users are still left wondering whether any data they may have previously been viewing or interacting with was lost due to the reboot.

Conventionally, many applications (e.g., the Microsoft Office® suites, etc.) comprise auto-save features that automatically save content at predefined intervals (e.g., after a predetermined time period, after a predetermined amount of user input is received, each time an application closes, etc.). These applications may allow a user to quickly recover a recently closed document (e.g., a document closed by the system to perform the reboot, a document closed by the system resultant from an unexpected shutdown, etc.) without losing much, or any, of the data in the application prior to closing. In other instances, internet browsing applications, such as Google Chrome®, attempt to maintain the application state so that after a reboot or an unexpected shutdown the application may automatically reinitiate the browser windows that the user originally had open.

However, these conventional methods for automatically saving and/or restoring data still contain a variety of issues. For instance, one issue is that not all applications have auto-save features (e.g., Notepad, Paint, etc.). For these applications, a user may lose all previously unsaved data. Additionally, in the case of internet browser windows, although the browser windows may get restored, the content within those windows may not be saved. For example, a user may be in the process of filling out a long document online when a reboot or unexpected shutdown occurs (e.g., a college admissions application, a job application, online tax forms, etc.). After re-initiation of the browser application, although the website browser page may be restored, the previously entered data on that webpage may not have been saved, in which case the user may need to start filling out the document from the beginning. Furthermore, although most conventional automatic reboots occur at predefined times (e.g., in the middle of the night, etc.), many occur sporadically. As such, a user may not be aware of an impending reboot and know to save sensitive data.

Accordingly, an embodiment may provide a notification to a user that an application that does not support one or any auto-save features comprises unsaved data. In an embodiment, user input provided to one or more applications of an information handling device may be identified. An embodiment may identify whether at least one of the applications that the user input was provided to does not support some or all auto-save features. An embodiment may thereafter determine whether the user input has been saved and, responsive to determining that the user input has not been saved, an embodiment may provide a notification to a user indicating that the user input has not been saved. Such a method may alert users to unsaved data and may prevent the loss of said data responsive to a system reboot or another unexpected application shutdown event.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
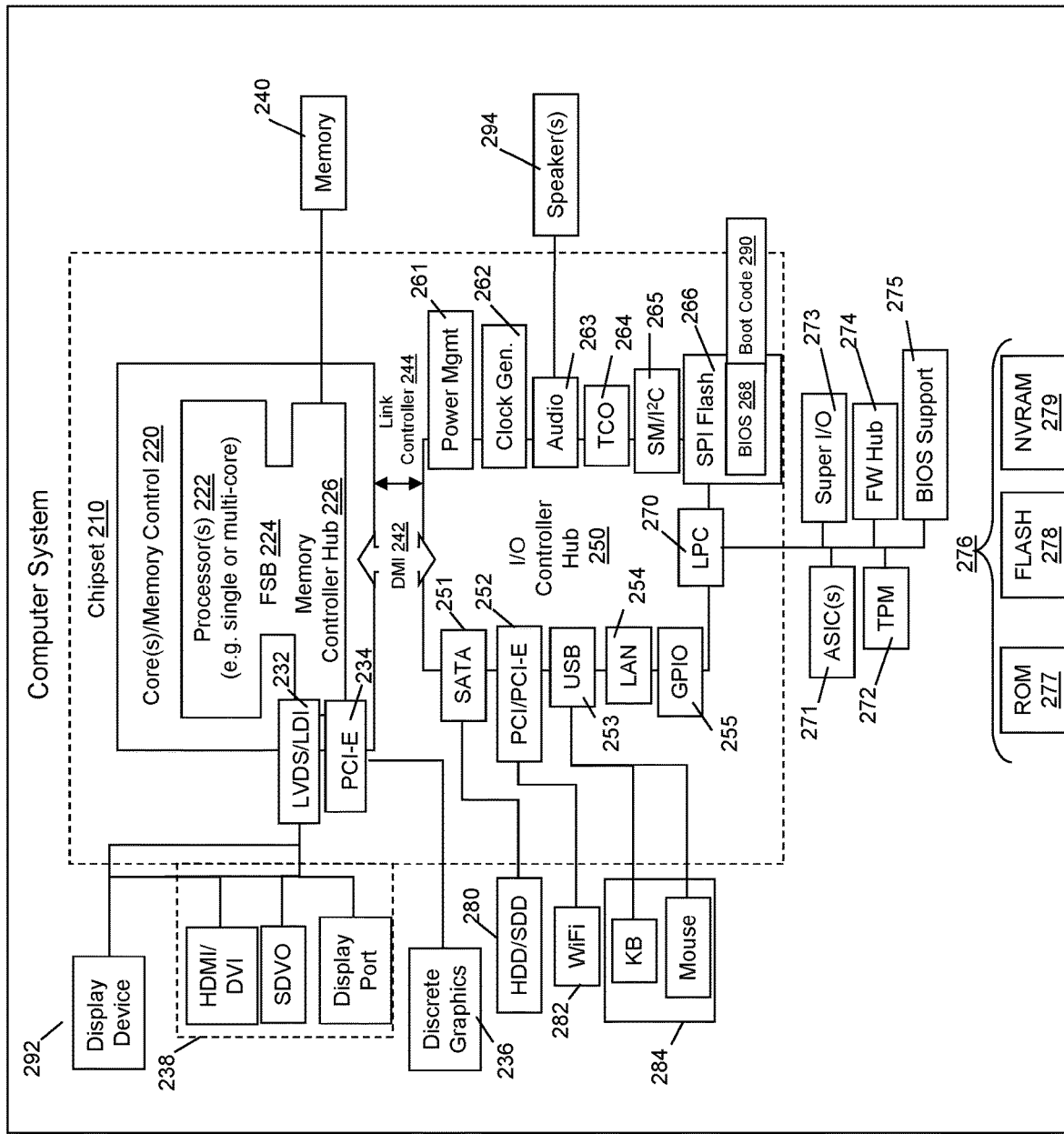
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS

268. As described herein, a device may include fewer or more features than shown in the system of FIG. 2.

Information handling device circuitry, as for example outlined in FIG. 1 or FIG. 2, may be used in devices such as tablets, smart phones, personal and laptop computer devices generally, and/or electronic devices which may have applications that users may interact with and provide savable input to. For example, the circuitry outlined in FIG. 1 may be implemented in a tablet or smart phone embodiment, whereas the circuitry outlined in FIG. 2 may be implemented in a personal computer embodiment.

Figure 3:
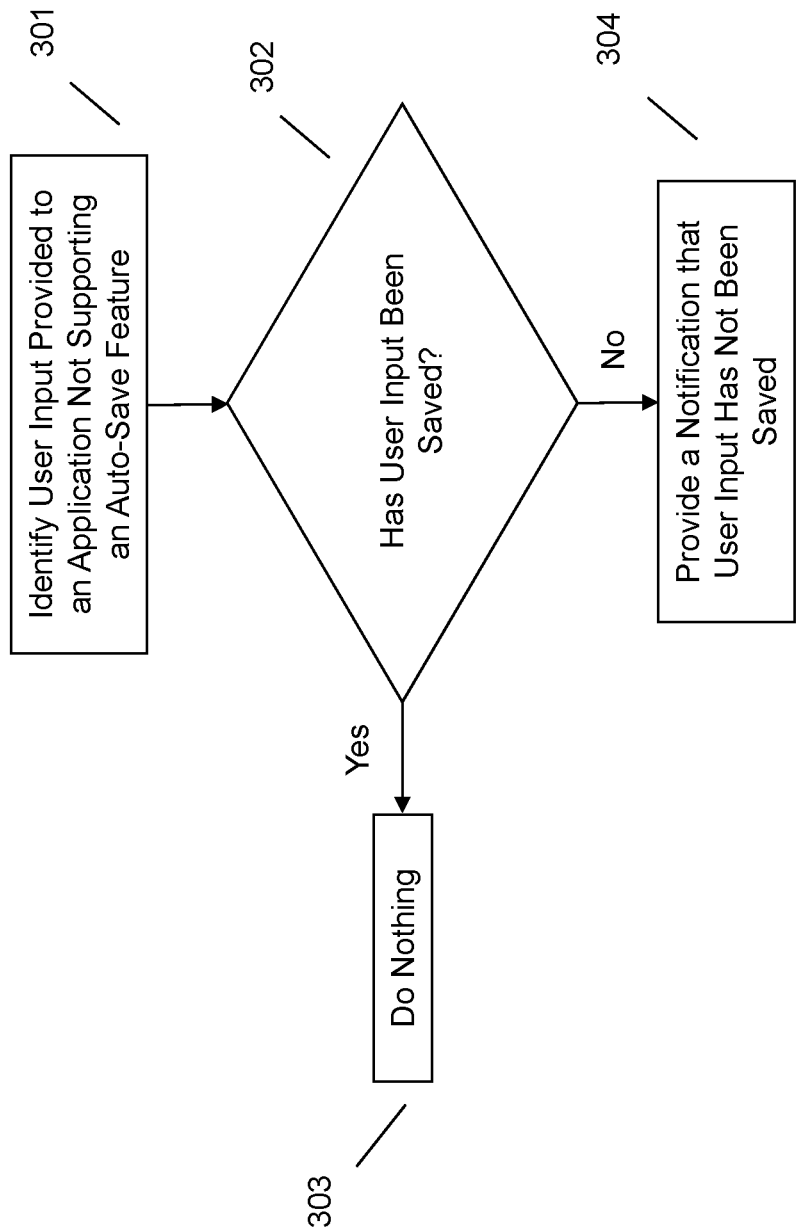
FIG. 3 illustrates an example method of providing a notification to a user apprising them of un-saved data.

Referring now to FIG. 3, an embodiment may provide a notification to a user that one or more applications not having auto-save features have currently unsaved data. At 301, an embodiment may identify user input provided to one or more applications of a device. In the context of this application the user input may be virtually any input a user may provide to an application. For example, the user input may be text-based input, static or dynamic image-based input, a combination thereof, and the like. In an embodiment, the input may be received at an input device (e.g., physical keyboard, on-screen keyboard, audio capture device, image capture device, video capture device, etc.) and may be provided by any known method of providing input to an electronic device (e.g., touch input, text input, voice input, etc.).

An embodiment may determine whether the one or more applications user input was provided to comprise one or many auto-save features. In the context of this application, auto-save features may be features that automatically save data at predetermined intervals (e.g., after a predetermined time period, responsive to an unexpected closure of the application, responsive to a system reboot, etc.). In an embodiment, the determination may be conducted by accessing a list of known applications (e.g., stored in an accessible storage database, etc.) that have auto-save features and thereafter comparing the one or more applications comprising unsaved data against the list. Responsive to identifying that one of the applications matches an application in the list, an embodiment may confirm that the underlying application comprises at least one auto-save feature. Responsive to not-identifying a match between an underlying application and an application in the list, an embodiment may conclude that the underlying application does not comprise any auto-save features. In another embodiment, the determination may be carried out by conducting a system resource inspection. The system resource inspection may, for example, analyze the capabilities and functions of each of the applications running on the system to identify which applications support any auto-save features.

At 302, an embodiment may determine whether the user input has been saved. The determination may be conducted using one or more saved data identification techniques. For example, an embodiment may be able to determine that a user has not performed a predetermined save input or save gesture (e.g., pressed a save button, performed a predetermined save combination such as control+s, etc.). In another embodiment, a system may compare the content in a current document to the content in a previously saved document and determine, based on the comparison, whether the current document comprises new content than the previously saved document.

Responsive to determining, at 302, that all of the applications support at least one auto-save feature and/or that all of the data in the applications that do not support at least one auto-save feature has been saved, an embodiment may, at 303, not provide a notification to a user. Conversely, responsive to determining, at 302, that at least one application does not support an auto-save feature and also comprises unsaved data, an embodiment may provide, at 304, a notification to a user that the user input in the at least one applications has not been saved.

In an embodiment, the notification may be provided to a user outside of the at least one application. For example, an application may be minimized, idle, or in a state where the content is not currently visible to a user, however, the user may still receive the notification. In an embodiment, the notification may be generated by an application independent of the at least one application. For example, the independent application may be in communication with and receive information from an application that does not support at least one auto-save feature (e.g., that data in that application has not been saved, etc.) but may still execute processes and function independent of the application.

In an embodiment, the notification may simply be a symbol (e.g., an exclamation point, etc.) placed over each application logo having unsaved data on the taskbar, desktop, or other location where the logo may be visible on the screen. Responsive to receiving a save input from the user, an embodiment may remove the notification from the taskbar icon. In another embodiment, the notification may be a pop-up window, for example, appearing in the center of a user's display, which may alert the user that one of more applications comprise unsaved data. In an embodiment, the pop-up window may identify the specific application(s) that have unsaved data and/or may prevent the user from performing other system functions until the data is saved. In yet another embodiment, the notification may be provided to a user on another device (e.g., smart phone, tablet, etc.). For example, a user may receive a push notification on their smart phone alerting them that there are one or more applications open on their laptop or personal computer that have unsaved data. In yet another embodiment, the notification may be provided responsive to identifying that the user input has not been saved for a predetermined amount of time (e.g., 5 minutes, 10 minutes, etc.). All of the aforementioned notification techniques may be utilized alone or in combination.

In addition to determining that at least one application that does not support auto-save features has unsaved data, an embodiment may also determine that a system reboot is impending. In the context of this application, a system reboot may be considered to be impending if the reboot will occur within a predetermined time period (e.g., within 30 minutes, within 6 hours, within 24 hours, etc.). In an embodiment, the notification that one or more applications have unsaved data may be provided at the moment an embodiment identifies that a system reboot is impending. For example, if an embodiment detects that a system reboot will occur in 24 hours, an embodiment may provide the notification to the user at the moment of identification.

In an embodiment, the notification may be provided responsive to identifying that the impending system reboot will occur within a predetermined time threshold (e.g., 5 minutes, 30 minutes, 1 hour, etc.). The predetermined time threshold may be set by a manufacturer or, alternatively, may be adjusted by a user. For example, the predetermined time threshold may be 10 minutes. Responsive to identifying that an impending system reboot is 10 minutes away, an embodiment may provide the notification to the user. In an embodiment, the notification may apprise the user of when the system reboot will occur. For example, the notification may contain a visual and/or audible alert stating that the system will reboot in 10 minutes, etc.

In an embodiment, the impending system reboot may be delayed until the user input in the application is saved. In an embodiment, the impending system reboot may be delayed automatically responsive to identifying that there is unsaved data. For example, an embodiment may automatically delay the system reboot for a predetermined amount of time (e.g., 5 minutes, 30 minutes, 1 hour, etc.). An embodiment may continually delay the impending system reboot by the predetermined amount of time until a delay threshold counter is reached. For example, an embodiment may delay the system reboot by 30 minutes up to five times. If a system does not receive explicit user save input by the fifth delay iteration, an embodiment may allow the system to commence with the system reboot.

In another embodiment, a user may delay the impending system reboot themselves after receiving the notification. For example, a user may access a system reboot manager and stop or delay the reboot. In another embodiment, a user may receive a notification on their mobile device (e.g., smart phone, tablet, etc.) that a system reboot is impending on another device (e.g., a laptop or personal computer, etc.). In such a situation, a user may delay the impending system reboot on the other device by using their mobile device. For example, a user may provide commands into an application on their mobile device that may send a wireless control signal to the other device to delay the impending system reboot.

In an embodiment, a notification may be provided only for applications that do not support at least one auto-save feature and that have unsaved data. Stated differently, if an application that does not any support auto-save features has its data recently saved by a user, then a notification may not be provided for that application. Alternatively, if a notification was recently provided for that application, an embodiment may remove the notification for that application (e.g., an embodiment may remove an exclamation point from above a corresponding taskbar icon for the application, a corresponding desktop icon for the application, etc.).

The various embodiments described herein thus represent a technical improvement to conventional user input saving techniques. Using the techniques described herein, an embodiment may identify that user input has been provided to one or more applications that do not support an auto-save feature. An embodiment may thereafter determine whether the user input to at least one of the underlying applications that do not support auto-save features comprises unsaved data. Responsive to this determination, an embodiment may provide a notification to a user to save the unsaved data. Additionally, an embodiment may provide the notification when an impending system reboot is detected. Such techniques may alert a user that certain applications they have interacted with contain unsaved data so that the user may take proactive steps to preserve that data.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   determining that at least one underlying application does not support an auto-save feature by accessing a list of known applications having auto-save features and comparing the at least one underlying application against the list;
   identifying, at an information handling device, user input provided to the at least one application;
   determining, using a processor, whether the user input has been saved; and
   providing, responsive to determining that the user input has not been saved, a notification to a user that the user input has not been saved, wherein the notification is generated by another application independent of the at least one underlying application.

2. The method of claim 1, wherein the providing comprises providing the notification responsive to identifying that the user input has not been saved for a predetermined amount of time.

3. The method of claim 1, wherein the notification is provided to the user on another device.

4. The method of claim 1, further comprising identifying, using a processor, an impending system reboot.

5. The method of claim 4, wherein the providing comprises providing the notification responsive to identifying the impending system reboot.

6. The method of claim 4, wherein the providing comprises providing the notification responsive to identifying that the impending system reboot will occur within a predetermined amount of time.

7. The method of claim 4, further comprising delaying the impending system reboot until the user input in the at least one underlying application is saved.

8. An information handling device, comprising:
   a processor;
   a memory device that stores instructions executable by the processor to:
   determine that at least one underlying application does not support an auto-save feature by accessing a list of known applications having auto-save features and comparing the at least one underlying application against the list;
   identify user input provided to the at least one application;
   determine whether the user input has not been saved; and
   provide, responsive to determining that the user input has not been saved, a notification to a user that the user input has not been saved, wherein the notification is generated by another application independent of the at least one underlying application.

9. The information handling device of claim 8, wherein the instructions executable by the processor to provide comprise instructions executable by the processor to provide the notification responsive to identifying that the user input has not been saved for a predetermined amount of time.

10. The information handling device of claim 8, wherein the notification is provided to the user on another device.

11. The information handling device of claim 8, wherein the instructions are further executable by the processor to identify an impending system reboot.

12. The information handling device of claim 11, wherein the instructions executable by the processor to provide the notification comprise instructions executable by the processor to provide the notification responsive to identifying the impending system reboot.

13. The information handling device of claim 11, wherein the instructions executable by the processor to provide the notification comprise instructions executable by the processor to provide the notification responsive to identifying that the impending system reboot will occur within a predetermined amount of time.

14. The information handling device of claim 11, wherein the instructions are further executable by the processor to delay the impending system reboot until the user input in the underlying application is saved.

15. A product, comprising:
   a storage device that stores code, the code being executable by a processor and comprising:
   code that determines that at least one underlying application does not support an auto-save feature by accessing a list of known applications having auto-save features and comparing the at least one underlying application against the list;
   code that identifies user input provided to the at least one application;
   code that determines whether the user input has been saved; and
   code that provides, responsive to determining that the user input has not been saved, a notification to a user that the user input has not been saved, wherein the notification is generated by another application independent of the at least one underlying application.

* * * * *